Figure 1:
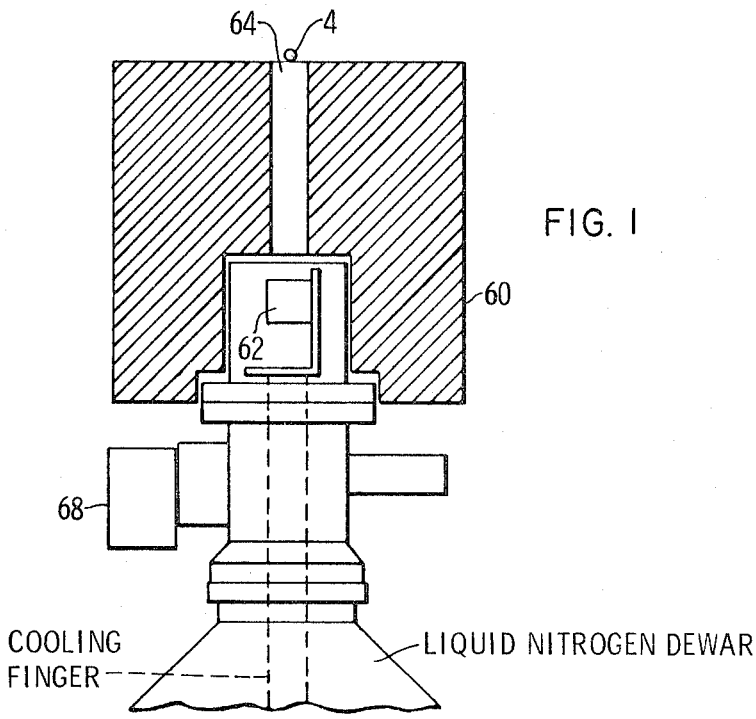
Figure 4:
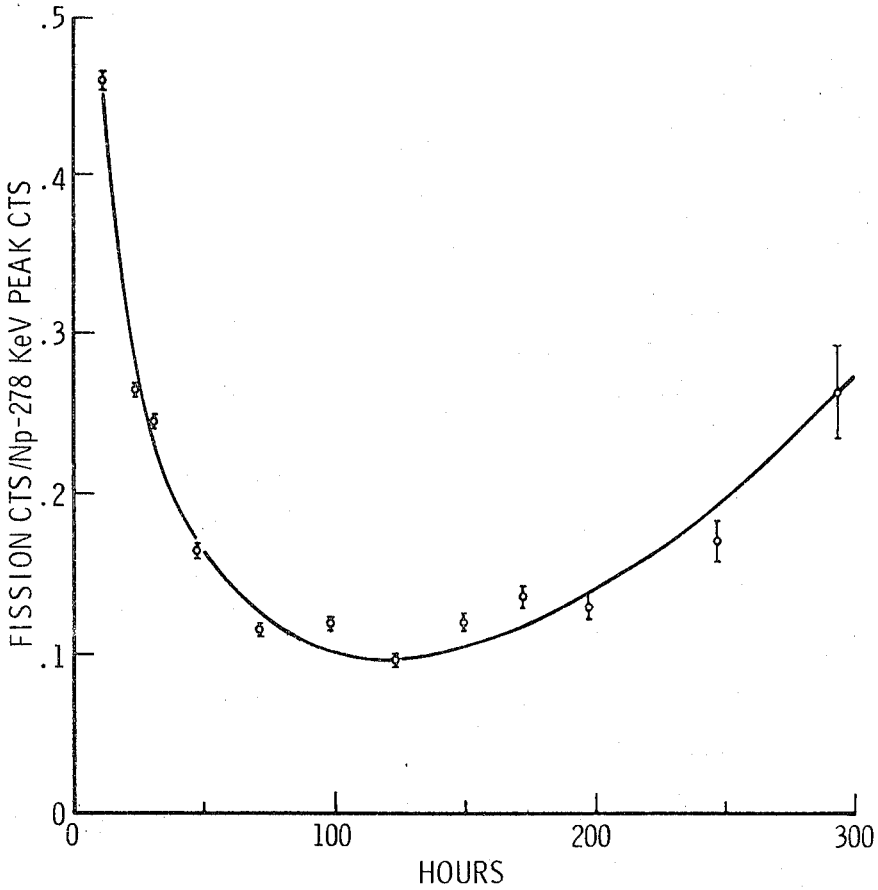
Figure 2A:
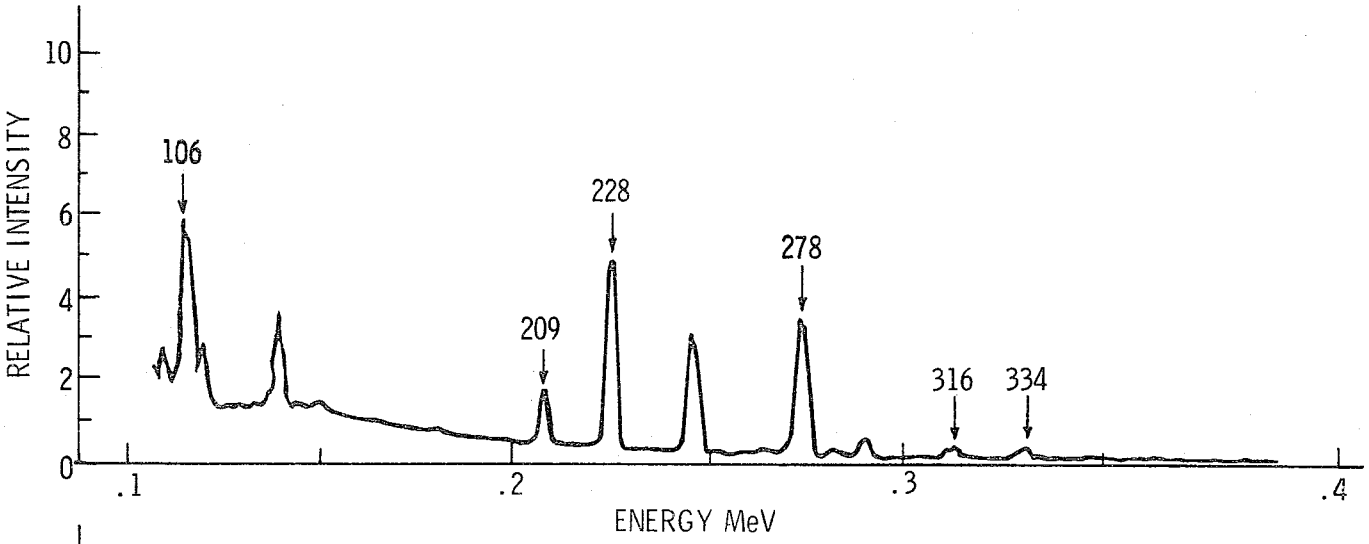
Figure 2B:
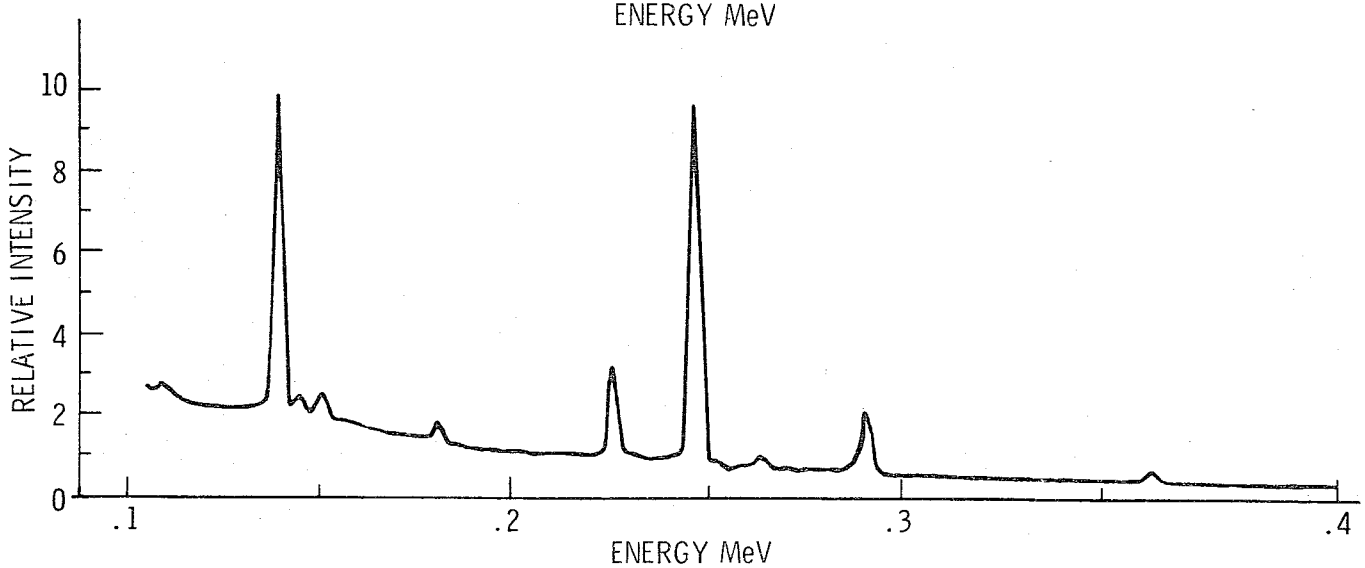
Figure 3A:
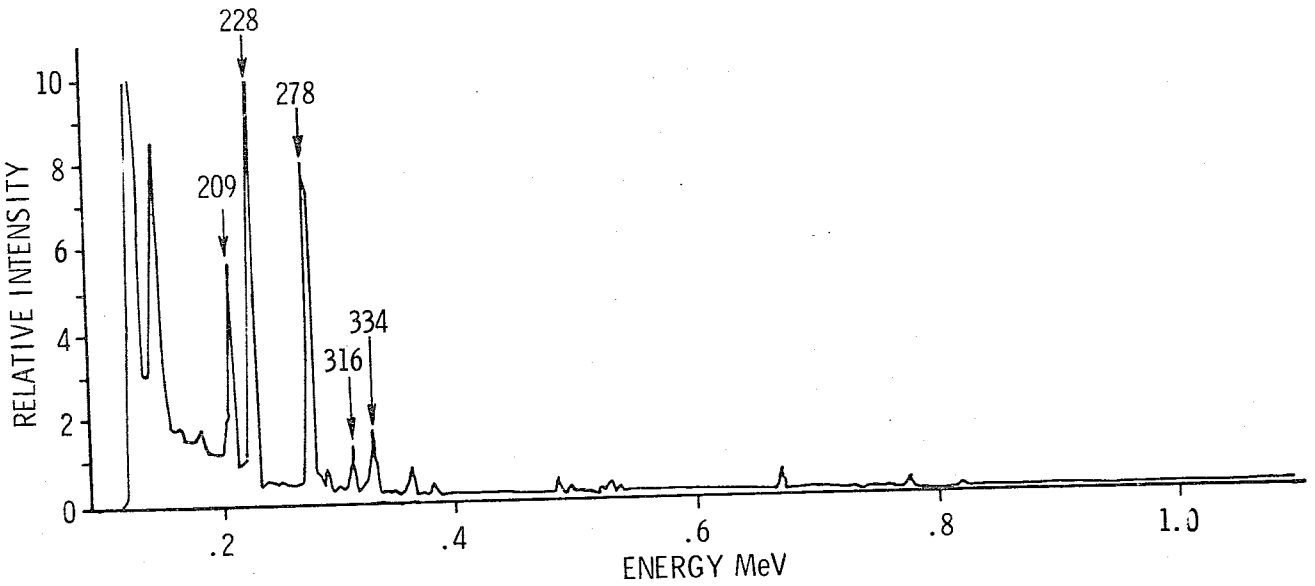
Figure 3B:
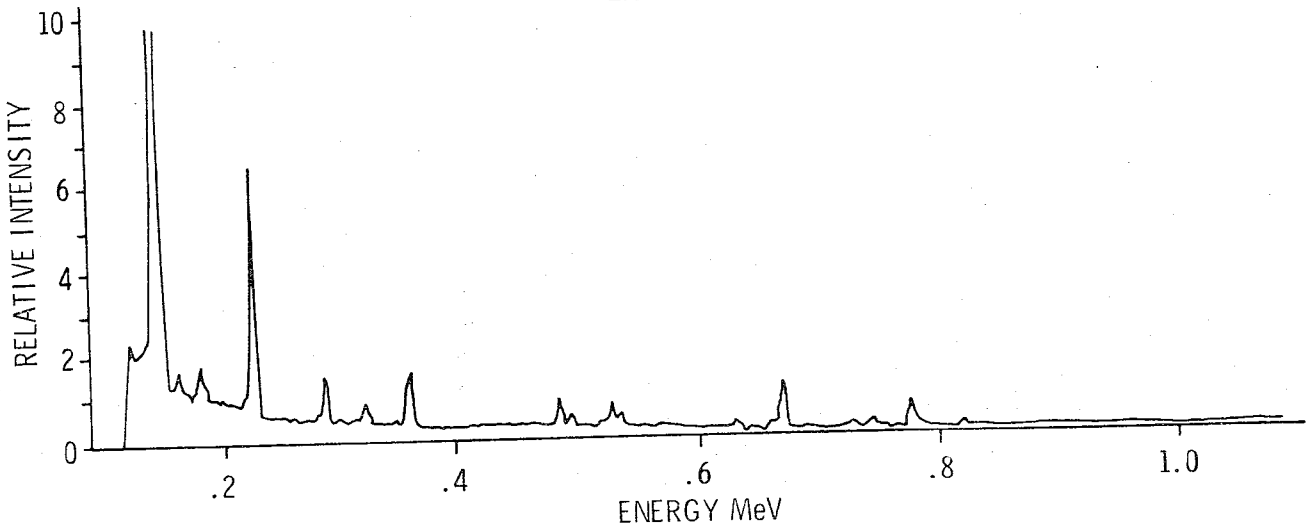
Figures 5, 6:
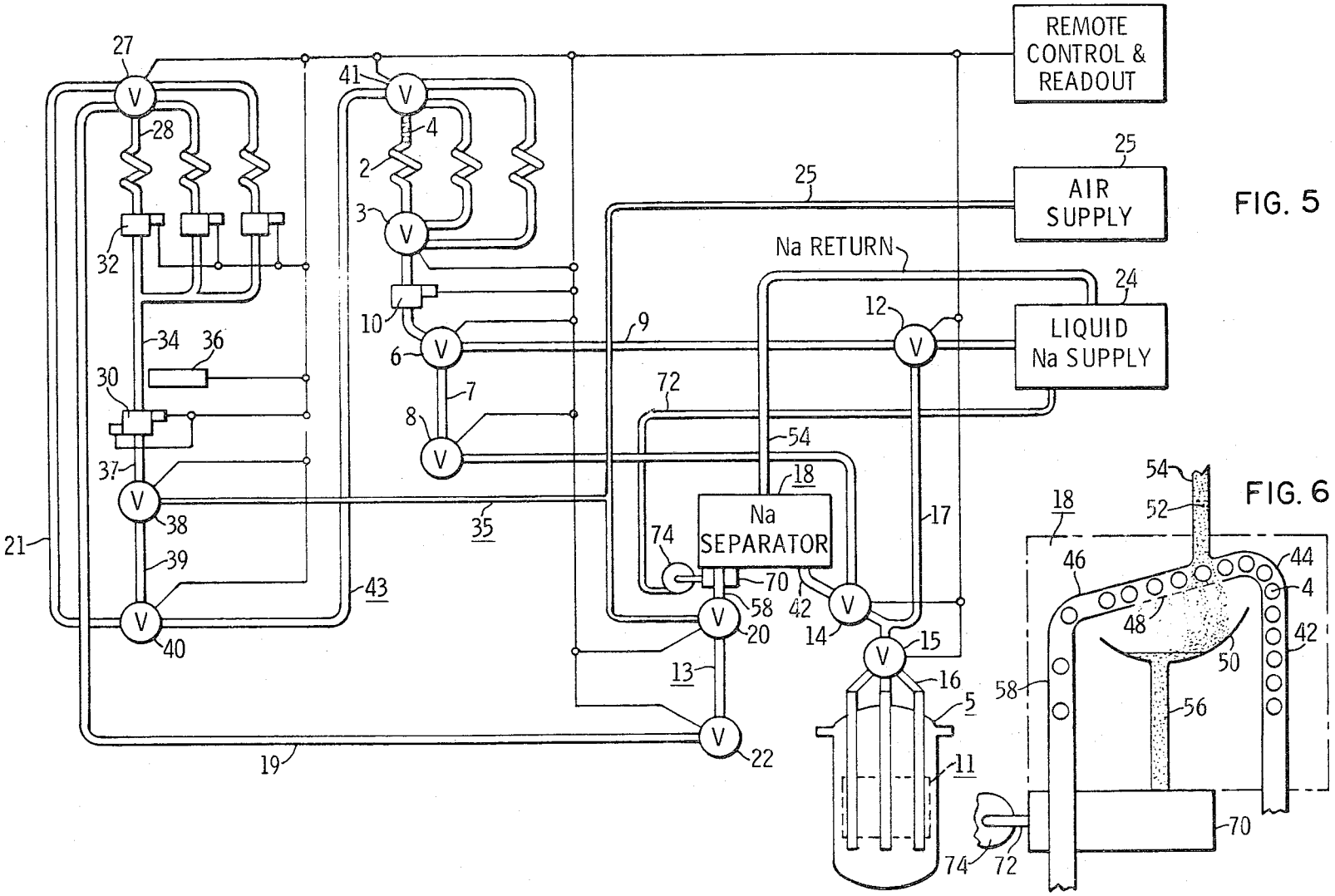

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 15, 1972

901 O.G. 777

T901,026

APPARATUS FOR POWER AND BREEDING DISTRIBUTION MEASUREMENTS IN BREEDER REACTORS

Norman P. Goldstein and Kuan H. Sun, Pittsburgh, Pa., assignors to Westinghouse Electric Corporation, Pittsburgh, Pa.

Filed Nov. 12, 1970, Ser. No. 88,605
Int. Cl. G01t *1/16, 3/00*
U.S. Cl. 250—83.3 R
4 Sheets Drawing. 28 Pages Specification

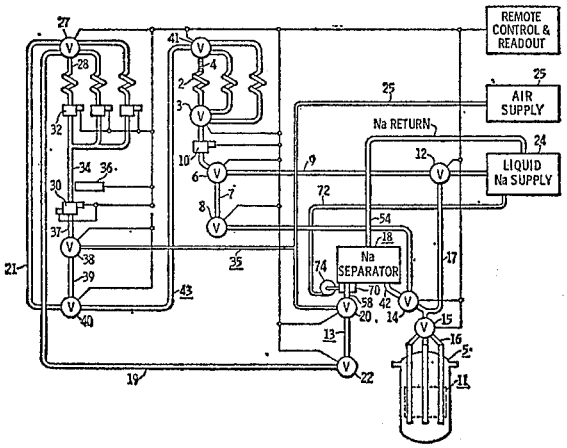

A method and apparatus is presented for determining the power and breeding distribution within a breeder reactor. Detectors comprising small diameter BeO balls 4 are introduced into a series of columnar tubes 16 running longitudinally through various parts of the reactor 5. After a short period of irradiation the detectors are sequentially transferred out of the reactor columns to a sodium separator 18 which is provided to drain and remove the active sodium surrounding the detectors. Upon exiting the sodium separator the detectors are conveyed to a parallel arrangement of storage conduits 28 in accordance with the original columnar array formed within the reactor. Once filled, the columns 28 are sequentially emptied past radiation counter 36 which records the detector readings indicative of the power measurement. The connecting conduits 37, 39 and 21 are coupled by the corresponding valves 38, 40 and 27 to return the detectors exiting the counter to the appropriate storage columns 28. This process is repeated until each of the storage columns 28 has been counted.

After a specified time for decay the aforementioned counting process is repeated to provide a determination of the breeding measurement. Upon exiting the counter 36 the detectors are routed to their respective initial storage conduits 2 in accordance with the original array formed within the reactor 5. Storage conduits 2 function as a decay reservoir to enable an adequate period for radioactive decay so that the process may be repeated to supply successive breeding and power determinations.

REMOTE CONTROL & READOUT
AIR SUPPLY
LIQUID Na SUPPLY
Na RETURN
Na SEPARATOR